United States Patent
Komatsu et al.

(10) Patent No.: US 10,152,034 B2
(45) Date of Patent: Dec. 11, 2018

(54) ROBOT CONTROL METHOD FOR PROCESSING A WORKPIECE ON A PROCESSING LINE

(71) Applicant: Panasonic Intellectual Property Management Co., Ltd., Osaka (JP)

(72) Inventors: Takamichi Komatsu, Osaka (JP); Kazumasa Yoshima, Osaka (JP); Tatsuya Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 180 days.

(21) Appl. No.: 15/126,881

(22) PCT Filed: Mar. 26, 2015

(86) PCT No.: PCT/JP2015/001722
§ 371 (c)(1),
(2) Date: Sep. 16, 2016

(87) PCT Pub. No.: WO2015/146180
PCT Pub. Date: Oct. 1, 2015

(65) Prior Publication Data
US 2017/0090431 A1    Mar. 30, 2017

(30) Foreign Application Priority Data
Mar. 27, 2014 (JP) .................. 2014-065178

(51) Int. Cl.
*G06F 19/00* (2018.01)
*G05B 13/02* (2006.01)
(Continued)

(52) U.S. Cl.
CPC ........ *G05B 13/0265* (2013.01); *B23K 9/1274* (2013.01); *B25J 9/1684* (2013.01);
(Continued)

(58) Field of Classification Search
CPC .............. G05B 13/0265; G05B 19/406; G05B 2219/36415; G05B 2219/45135;
(Continued)

(56) References Cited

U.S. PATENT DOCUMENTS 4,338,672 A  *  7/1982  Perzley .................... B25J 9/161
                                                         318/568.13
5,467,003 A     11/1995  Kosaka et al.
(Continued)

FOREIGN PATENT DOCUMENTS

EP    0 862 963        9/1998
JP    58-221672       12/1983
(Continued)

OTHER PUBLICATIONS

Extended European Search Report dated Jul. 27, 2017 in corresponding European Application No. 15770321.6.
(Continued)

*Primary Examiner* — Adam Lee
(74) *Attorney, Agent, or Firm* — Wenderoth, Lind & Ponack, L.L.P.

(57) ABSTRACT

A robot control method includes a teaching step, first processing step, modifying step, second processing step, and third processing step. In the modifying step, a third teaching point is changed to a second modified point, a fourth teaching point to a third modified point, and a fifth teaching point to a fourth modified point, based on a difference between a second teaching point and a first modified point. A profile modifying control to change the position of a work tool is applied, using a sensor mounted on the processing advancing direction side of the work tool, in the first processing step and the third processing step. An attitude of the work tool is changed during the second processing step.

7 Claims, 11 Drawing Sheets

(51) Int. Cl.
 *B23K 9/127* (2006.01)
 *B25J 9/16* (2006.01)
 *G05B 19/406* (2006.01)
(52) U.S. Cl.
 CPC .. *G05B 19/406* (2013.01); *G05B 2219/36415* (2013.01); *G05B 2219/36433* (2013.01); *G05B 2219/40385* (2013.01); *G05B 2219/45135* (2013.01); *G05B 2219/4701* (2013.01); *G05B 2219/4705* (2013.01); *G05B 2219/4719* (2013.01)
(58) Field of Classification Search
 CPC ........... G05B 2219/36433; G05B 2219/40385; G05B 2219/4705; G05B 2219/4719; G05B 2219/4701; B25J 9/1684; B23K 9/1274
 See application file for complete search history.

(56) References Cited

U.S. PATENT DOCUMENTS

| | | | | |
|---|---|---|---|---|
| 5,534,705 | A | | 7/1996 | Terawaki et al. |
| 5,539,172 | A | * | 7/1996 | Takase .................. B23F 17/006 219/69.17 |
| 5,582,750 | A | | 12/1996 | Hamura et al. |
| 5,624,588 | A | * | 4/1997 | Terawaki ............. B23K 9/1272 219/124.34 |
| 5,822,207 | A | * | 10/1998 | Hazama ................ B25J 9/1666 700/104 |
| 6,161,055 | A | * | 12/2000 | Pryor ................. G05B 19/4065 382/152 |
| 6,285,920 | B1 | * | 9/2001 | McGee ................ G05B 19/423 219/125.11 |
| 6,317,653 | B1 | * | 11/2001 | Kamiya ................. B25J 9/1633 318/566 |
| 6,341,243 | B1 | * | 1/2002 | Bourne .................... B21D 5/02 700/145 |
| 6,871,521 | B2 | * | 3/2005 | Sperrer .................... B21D 5/02 700/165 |
| 7,283,891 | B2 | * | 10/2007 | Butscher .................. A61C 7/04 140/149 |
| 2001/0013511 | A1 | * | 8/2001 | Hong ................. B23K 9/1278 219/124.34 |
| 2001/0041129 | A1 | * | 11/2001 | Tsuneda ................... B25J 9/042 414/744.1 |
| 2002/0133926 | A1 | * | 9/2002 | Kilian ...................... B21D 5/02 29/33 R |
| 2004/0166776 | A1 | * | 8/2004 | Kondo ...................... B24B 5/42 451/28 |
| 2005/0043837 | A1 | * | 2/2005 | Rubbert .................... A61C 7/00 700/98 |
| 2009/0187276 | A1 | * | 7/2009 | Nagatsuka ............. B25J 9/1697 700/245 |
| 2010/0307300 | A1 | * | 12/2010 | Kuriya ..................... B23Q 7/10 82/125 |
| 2011/0030848 | A1 | * | 2/2011 | Weinnnann .......... G05B 19/404 144/402 |
| 2011/0190922 | A1 | * | 8/2011 | Walker .................... B24B 13/06 700/118 |
| 2011/0238215 | A1 | * | 9/2011 | Yanagawa .............. G05B 19/42 700/258 |
| 2011/0251714 | A1 | * | 10/2011 | Nishikawa ............. B23Q 17/20 700/174 |
| 2012/0236140 | A1 | * | 9/2012 | Hazeyama ............. B25J 9/1697 348/94 |
| 2013/0152652 | A1 | * | 6/2013 | Allwood ................ B21D 22/16 72/85 |
| 2013/0167389 | A1 | * | 7/2013 | Christoph ............ G01B 21/045 33/503 |

FOREIGN PATENT DOCUMENTS

| | | |
|---|---|---|
| JP | 60-203368 | 10/1985 |
| JP | 62-137177 | 6/1987 |
| JP | 4-367373 | 12/1992 |
| JP | 6-149327 | 5/1994 |
| JP | 6-320462 | 11/1994 |
| JP | 6-324733 | 11/1994 |
| JP | 8-039470 | 2/1996 |
| JP | 2001-071286 | 3/2001 |
| JP | 2003-053539 | 2/2003 |
| JP | 2003-164982 | 6/2003 |
| JP | 2007-185666 | 7/2007 |
| JP | 2007-290025 | 11/2007 |
| JP | 2011-138275 | 7/2011 |
| JP | 2011-206830 | 10/2011 |

OTHER PUBLICATIONS

International Search Report of PCT application No. PCT/JP2015/001722 dated Jun. 23, 2015.

* cited by examiner

Feature point P

Feature point P

ROBOT CONTROL METHOD FOR PROCESSING A WORKPIECE ON A PROCESSING LINE

CROSS-REFERENCE TO RELATED APPLICATIONS

This application is a U.S. national stage application of the PCT International Application No. PCT/JP2015/001722 filed on Mar. 26, 2015, which claims the benefit of foreign priority of Japanese patent applications 2014-065178 filed on Mar. 27, 2014, the contents all of which are incorporated herein by reference.

TECHNICAL FIELD

The disclosure relates to robot control methods for moving a work tool along a bent processing line based on information from a sensor mounted on the work tool for recognizing a shape of workpiece.

BACKGROUND ART

Recently, a higher quality of work has been demanded in industrial robots. To meet this demand, a sensor for recognizing the shape of workpiece is further mounted on a work tool attached to a tip of the robot. This sensor recognizes differences with teaching points set before processing that may occur during processing, and modifies processing points in real time.

PTL1 and PTL2 describe a control method of a welding robot to which a laser sensor and welding torch are attached at its tip.

Figure 17:
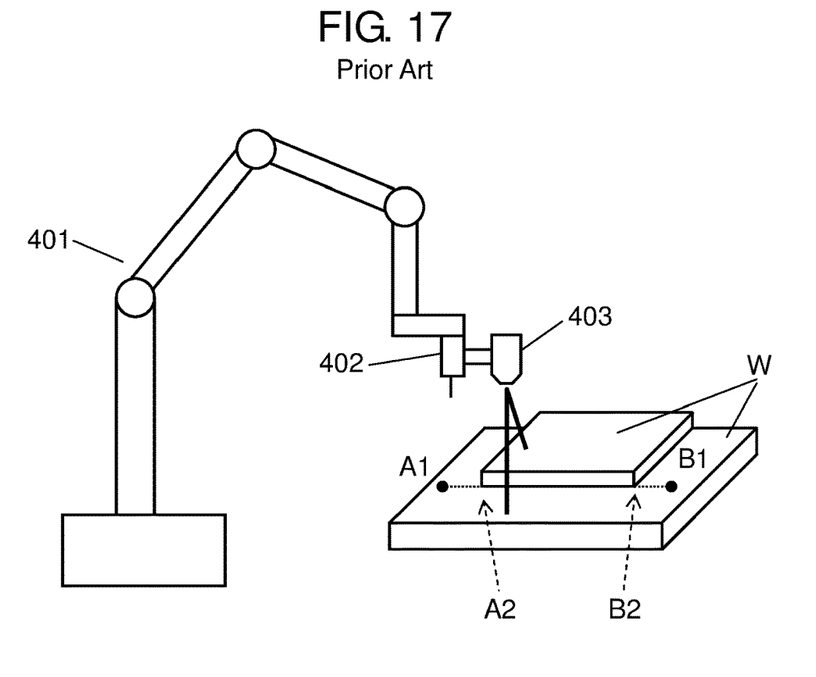
FIG. 17 is a schematic view of a conventional welding robot.
Figure 18:
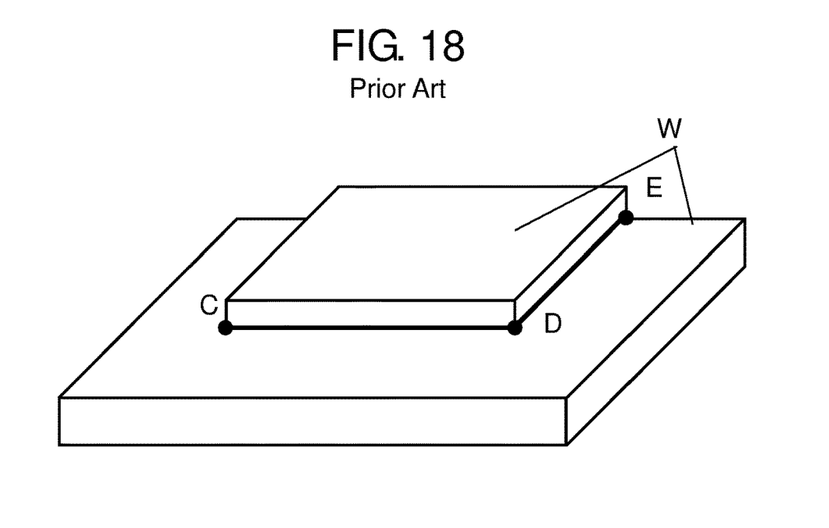
FIG. 18 is a perspective view illustrating a disadvantage of a conventional robot system.

A conventional robot control method is described with reference to FIG. 17. FIG. 17 is a schematic view of a conventional welding robot. Conventional welding robot 401 includes welding torch 402 and laser sensor 403. Laser sensor 403 is provided ahead of welding torch 402 in a welding advancing direction to detect a shape of workpiece W. When welding workpiece W, welding robot 401 moves welding torch 402 and laser sensor 403 from teaching point A1 to teaching point B1 set before starting welding in a state an output of laser sensor 403 is turned ON. Laser sensor 403 recognizes a point where the shape of workpiece W changes (a point where a step occurs) as welding start point A2, and welding by welding torch 402 starts from welding start point A2. Laser sensor 403 recognizes a point where the shape of workpiece W changes (a point where the step disappears) as welding end point B2, and welding by welding torch 402 ends at welding end point B2.

Laser sensor 403 continues to detect the shape of workpiece W also during welding of workpiece W by welding torch 402, and modifies the welding point by welding torch 402. This enables to achieve welding that is applicable to any displacement in welding point that may occur during welding.

CITATION LIST

Patent Literature

PTL1 Japanese Patent Unexamined Publication No. 118-39470

PTL2 Japanese Patent Unexamined Publication No. 2007-185666

SUMMARY

In the conventional robot control method, however, the shape of workpiece W to be detected by laser sensor 40 needs to have a fixed shape, and only linear welding is performed. Therefore, for example, to weld along an L-shaped welding line from point C to point E via point D with respect to workpieces W, welding is achieved in two operations. In other words, welding needs to take place from point C to point D in the first step, and then from point D to point E in the second step. The L-shaped welding line cannot thus be welded continuously, and a desired bead shape cannot be achieved at a portion bent in the L shape. Work efficiency is also low.

The disclosure provides a robot control method that achieves continuous processing although a processing line is bent, such as an L shape, to achieve a required finish and also higher work efficiency.

To solve the above disadvantage, the robot control method of the disclosure includes the teaching step, first processing step, modifying step, second processing step, and third processing step. In the teaching step, a first teaching point, second teaching point, third teaching point, fourth teaching point, and fifth teaching point are set in this order on a bent processing line of a workpiece. In the first processing step, the workpiece is processed from the first teaching point to a first modified point. In the modifying step, the third teaching point is changed to a second modified point, the fourth teaching point to a third modified point, and the fifth teaching point to a fourth modified point based on an amount of difference between the second teaching point and the first modified point. In the second processing step, the workpiece is processed from the first modified point to the third modified point via the second modified point. In the third processing step, the workpiece is processed from the third modified point toward the fourth modified point. The third teaching point is a bent point in the processing line. In the first processing step and the third processing step, a sensor mounted on the processing advancing direction side of the work tool is used for profile modifying control for changing the position of the work tool. The first modified point is a point reached as a result of the profile modifying control based on the second teaching point in the first processing step. During the second processing step, the attitude of the work tool is changed.

As described above, the robot control method in the disclosure can continuously process to achieve a required finish although a bent portion exists in the processing line. The work efficiency can also be further improved.

DESCRIPTION OF EMBODIMENTS (Exemplary Embodiment)

The exemplary embodiment is described with reference to FIG. 1 to FIG. 16.

(Configuration of Robot System 100)

Figure 1:
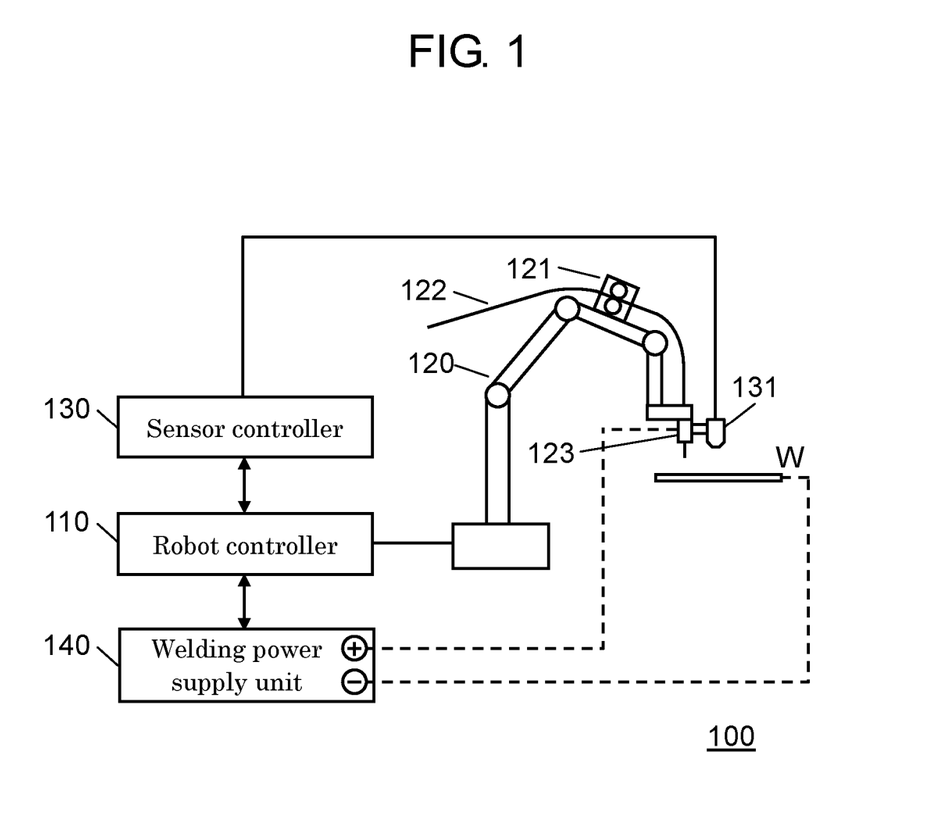
FIG. 1 is a schematic diagram of a robot system in accordance with an exemplary embodiment.

FIG. 1 is a schematic diagram of robot system 100. In FIG. 1, robot system 100 includes robot controller 110, manipulator 120, sensor controller 130, and welding power supply unit 130. Welding wire feeder 121, welding wire 122, welding torch 123 (work tool), and sensor 131 are provided on manipulator 120.

Robot controller 110 typically has CPU (Central Processing Unit, not illustrated) and memory (not illustrated) inside for executing various calculations at high speed. Robot controller 110 is connected to manipulator 120 to control the operation of manipulator 120. Robot controller 110 is connected to sensor controller 130 to control sensor controller 130. Robot controller 110 is connected to welding power supply unit 140 to control welding power supply unit 140.

Manipulator 120 is configured with multiple servo motors, and robot controller 110 controls manipulator 120 to conduct various operations. Welding torch 123 is provided at a tip of manipulator 120, and welding torch 123 has a gas nozzle (not illustrated) at its tip. The gas nozzle supplies shielding gas fed from a gas canister (not illustrated) to a welding point of workpiece W based on a command from welding power supply unit 140. A contact chip (not illustrated) is also attached to the tip of welding torch 123. Welding wire 122 is supplied and power is supplied through this contact chip of welding torch 123.

Welding power supply unit 140 typically includes an output part (not illustrated) for flowing welding current by applying welding voltage, a voltage detection part (not illustrated) for detecting the welding voltage, and a welding wire control part (not illustrated) for controlling welding wire feeder 121. The output part of welding power supply unit 140 is electrically coupled to welding torch 123 and workpiece W. The output part of welding power supply unit 140 applies the welding voltage between welding wire 122, which is a consumable electrode, and workpiece W based on a command from robot controller 110.

Welding wire feeder 121 is mounted on an upper part of manipulator 120. Welding wire feeder 121 includes a feeding motor with guide roller and an angle detector for detecting a rotation angle of the feeding motor by an angular sensor (not illustrated), such as an encoder. Welding wire feeder is controlled by welding power supply unit 140, and feeds welding wire 122, which is a consumable electrode, to welding torch 123.

When welding starts according to a command from robot controller 110, welding power supply unit 140 applies welding voltage between workpiece W and welding wire 122, and also controls welding wire feeder 121 such that welding wire 122 is fed at a feeding speed determined by command current. This generates arc between welding wire 122 fed and workpiece W, and welding takes place by droplet transfer from welding wire 122 to workpiece W.

Sensor controller 130 is connected to sensor 131 to control sensor 131. Sensor 131 can two-dimensionally or three-dimensionally detect the shape of workpiece W (surface shape) in a noncontact manner. A method adopting laser beam is a known method of detecting the shape of workpiece W in a noncontact manner by sensor 131. The detection method using laser beam includes methods of calculating a distance based on time until laser beam reflects on workpiece and returns after pulse-waveform laser beam is emitted from sensor 131, and based on an angle of returning laser beam reflected on workpiece W. In general, sensor 131 detects the shape of workpiece W by scanning a broad range by laser beam, using an oscillating mirror.

(Modification of Welding Point By Sensor 131)

Figure 2:
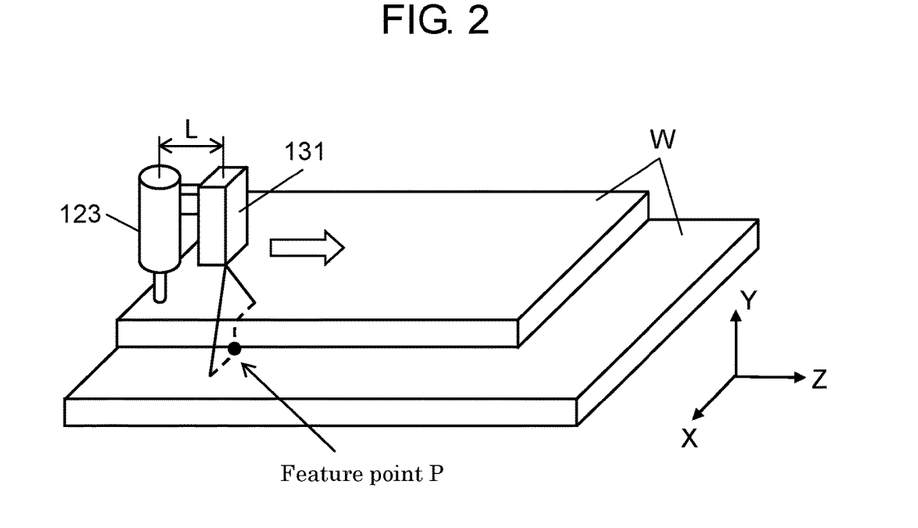
FIG. 2 is a perspective view illustrating a processing step in accordance with the exemplary embodiment.
Figure 3:
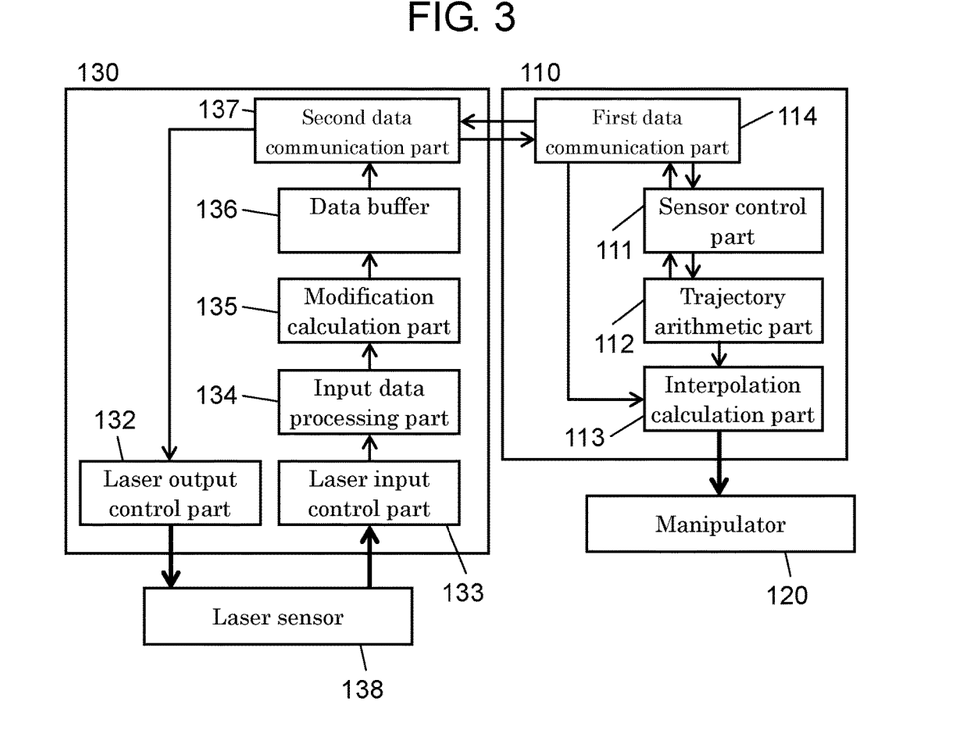
FIG. 3 is a block diagram of robot controller and sensor controller in accordance with the exemplary embodiment.
Figure 4:
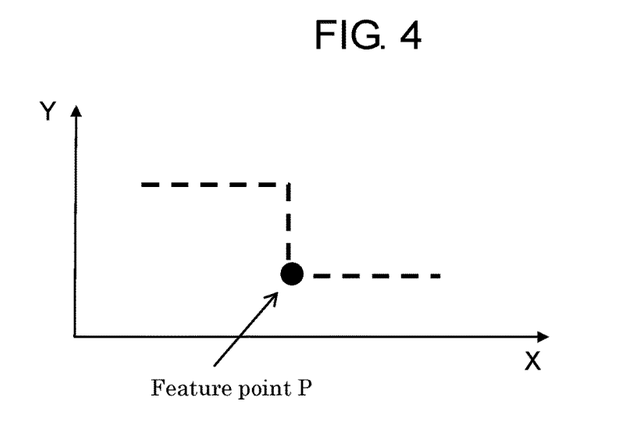
FIG. 4 illustrates a result of detecting a shape of workpiece by a sensor in accordance with the exemplary embodiment.
Figure 5:
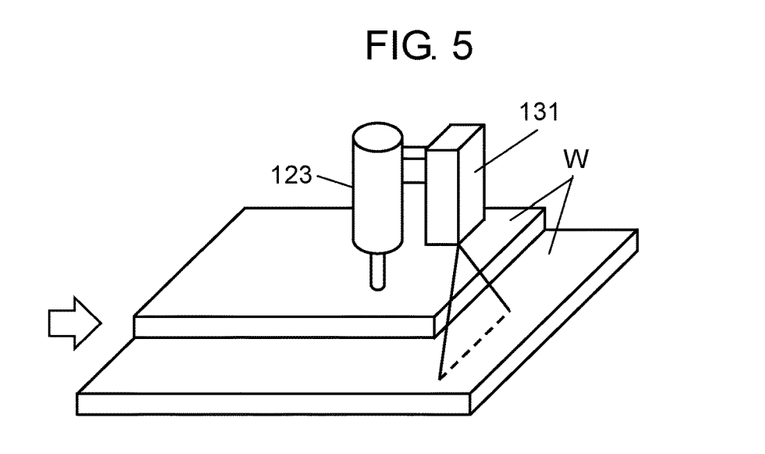
FIG. 5 is a perspective view illustrating detection of the shape of workpiece by the sensor in accordance with the exemplary embodiment.
Figure 6:
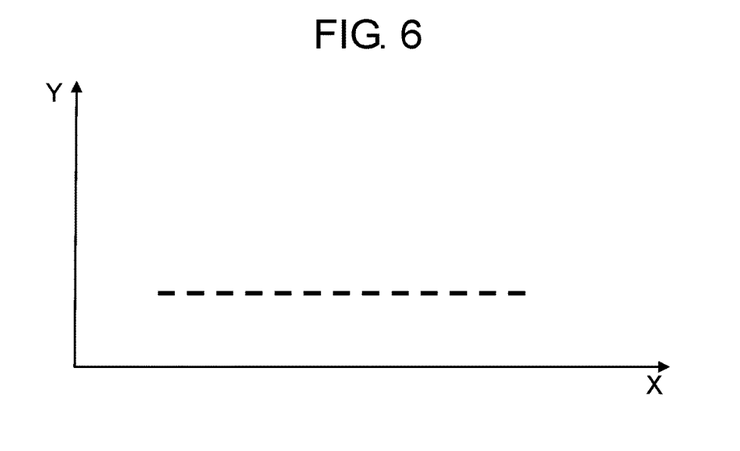
FIG. 6 illustrates a result of detecting the shape of workpiece by the sensor in accordance with the exemplary embodiment.

The control of sensor 131 is further described with reference to FIG. 2 to FIG. 6. FIG. 2 is a perspective view illustrating a processing step in the exemplary embodiment. FIG. 3 is a block diagram of robot controller 130 and sensor controller 130 in the exemplary embodiment. FIG. 4 illustrates a result of detecting the shape of workpiece by the sensor. FIG. 5 illustrates detection of the shape of workpiece by the sensor in the exemplary embodiment. FIG. 6 illustrates a result of detecting the shape of workpiece by the sensor in the exemplary embodiment.

As shown in FIG. 2, sensor 131 is provided in front of welding torch 123 in the welding advancing direction. Distance L between sensor 131 and welding torch 123 is equivalent to a distance between a position on workpiece scanned by sensor 131 and a welding point that is the tip of welding wire 122.

As shown in FIG. 3, robot controller 110 includes sensor control part 111, trajectory arithmetic part 112, interpolation calculation part 113, and first data communication part 114. Sensor control part 111 sends a sensor output command to sensor controller 130 via first data communication part 114 based on a command in a teaching program stored in robot controller 110.

As shown in FIG. 3, sensor controller 130 includes laser output control part 132, laser input control part 133, input data processing part 134, modification calculation part 135, data buffer 136, and second data communication part 137. When sensor controller 130 receives a sensor output command from robot controller 110, laser output control part 132 controls laser sensor 138, which is an example of sensor 131, and laser sensor 138 outputs laser beam. Here, by using the oscillating mirror (not illustrated), sensor controller 130 outputs laser beam in a radial fashion to workpiece W, as shown in FIG. 2. Laser input controller 133 receives information on the laser beam received (reflected light) from laser sensor 138 receiving the reflected light of laser beam output in a radial fashion. Input data processing part 134 then applies arithmetic processing to the laser beam (reflected light) received. Input data processing part 134 expresses and plots each element point as a coordinate on a sensor coordinate system. In this way, as shown in FIG. 4, the shape of workpiece W is detected, and a coordinate of feature point P can be calculated. As shown in FIG. 2 and FIG. 4, the welding advancing direction is the Z axis, a horizontal direction (within the plane of workpiece W) relative to the welding advancing direction is the X axis, and a vertical direction (vertical direction of workpiece W) relative to the welding advancing direction is the Y axis in the exemplary embodiment. This feature point P is a target welding point of welding torch 123.

When laser sensor 138 outputs laser beam at a position shown in FIG. 5, a shape of workpiece W shown in FIG. 6 is detected. In this case, feature point P cannot be detected. Accordingly, it is apparent that a point shifting between absence and presence of feature point P is an edge of one of two workpieces W.

(Operation of Robot System 100)

Figure 7:
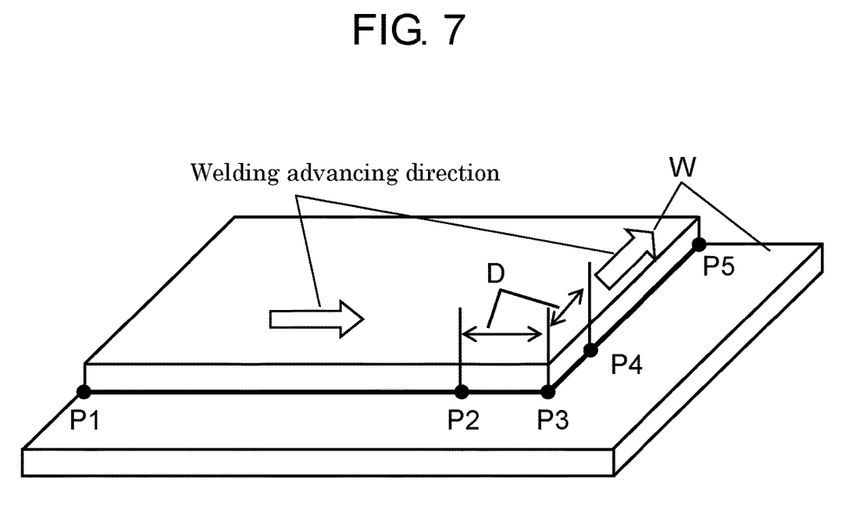
FIG. 7 is a perspective view illustrating teaching points in accordance with the exemplary embodiment.
Figure 8:
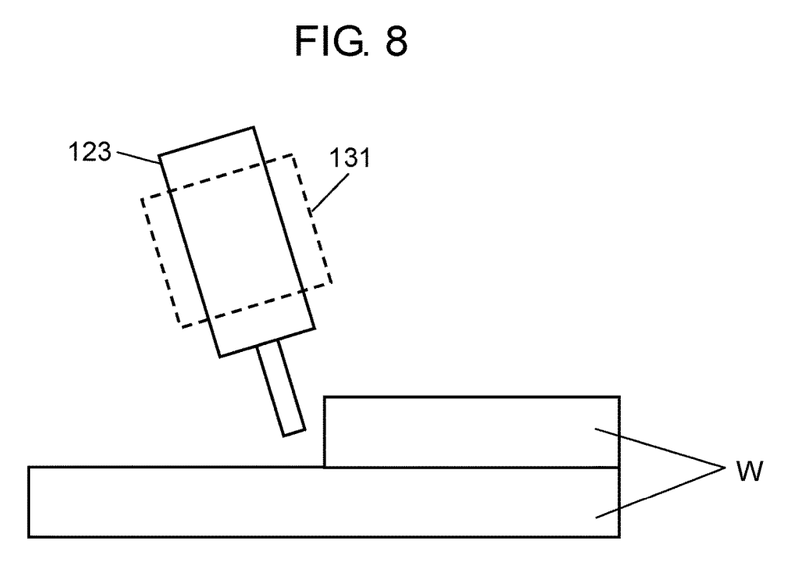
FIG. 8 is a sectional view illustrating an attitude of a welding torch relative to workpieces in accordance with the exemplary embodiment.
Figure 9:
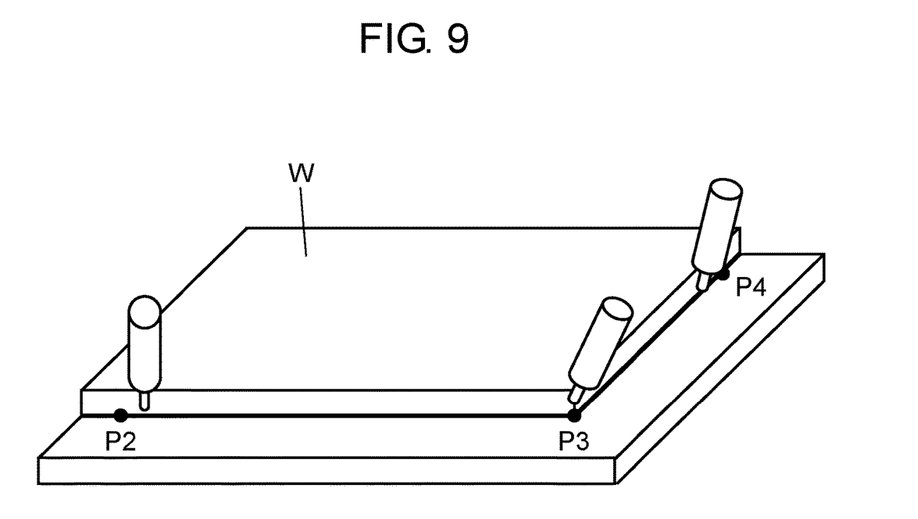
FIG. 9 is a perspective view illustrating the attitude of the welding torch relative to the workpieces at each teaching point in accordance with the exemplary embodiment.
Figure 10:
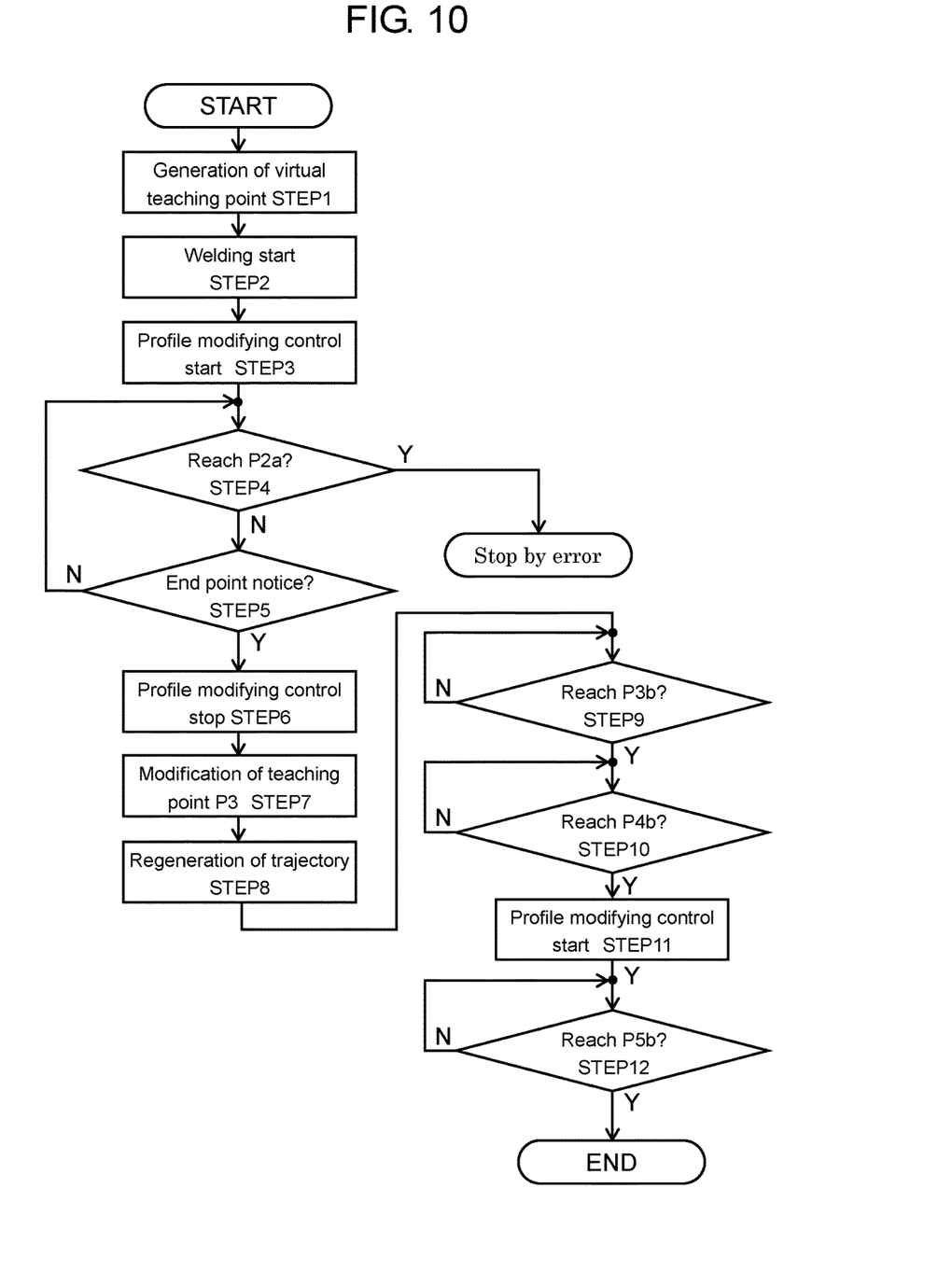
FIG. 10 is a flowchart illustrating a robot control method in accordance with the exemplary embodiment.
Figure 11:
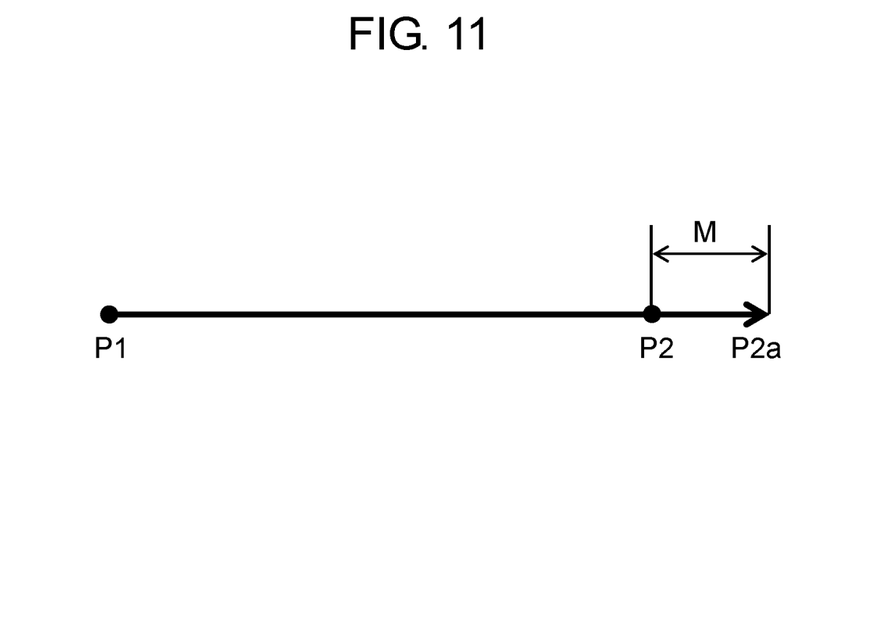
FIG. 11 illustrates a method of generating an abnormality decision point from the teaching point in accordance with the exemplary embodiment.
Figure 12:
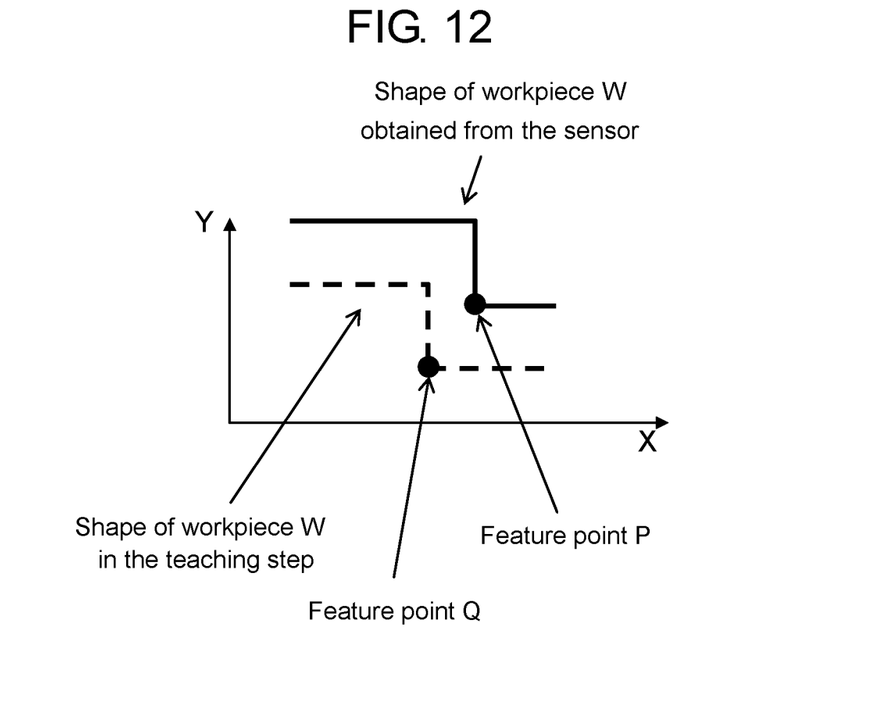
FIG. 12 illustrates calculation of an amount of modification of a welding point from the shape of workpiece detected by the sensor.
Figure 13:
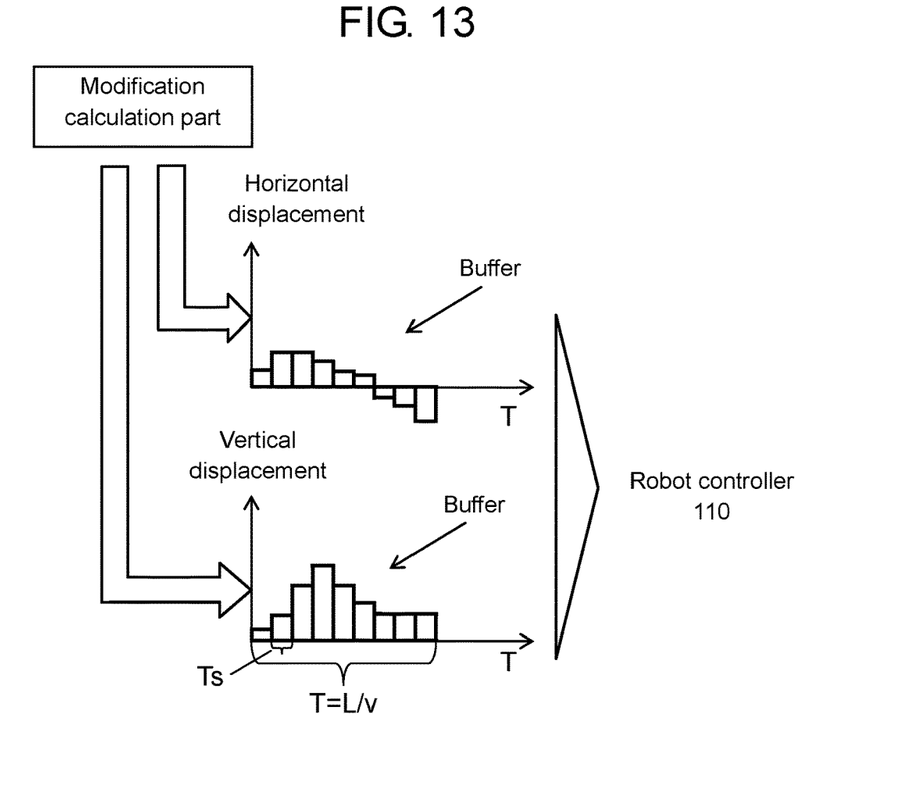
FIG. 13 illustrates notification of the amount of modification of the welding point to the robot controller.
Figure 14:
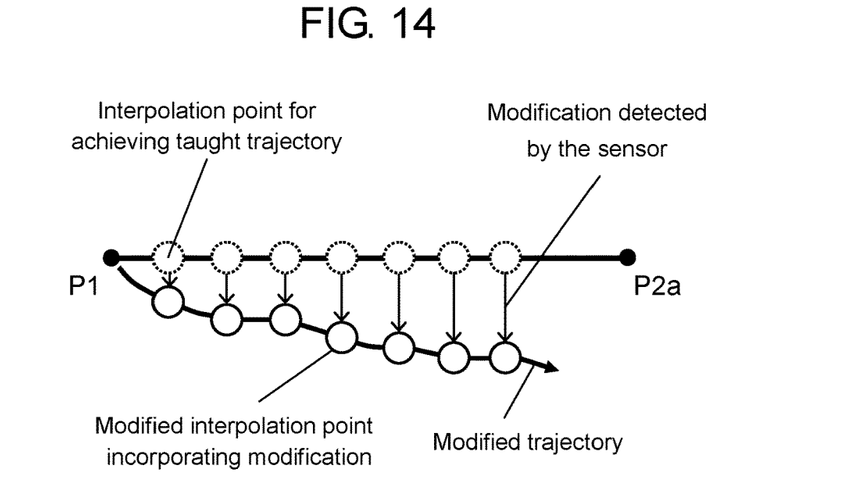
FIG. 14 illustrates modification of an interpolation point based on modification of the welding point by the robot controller.
Figure 15:
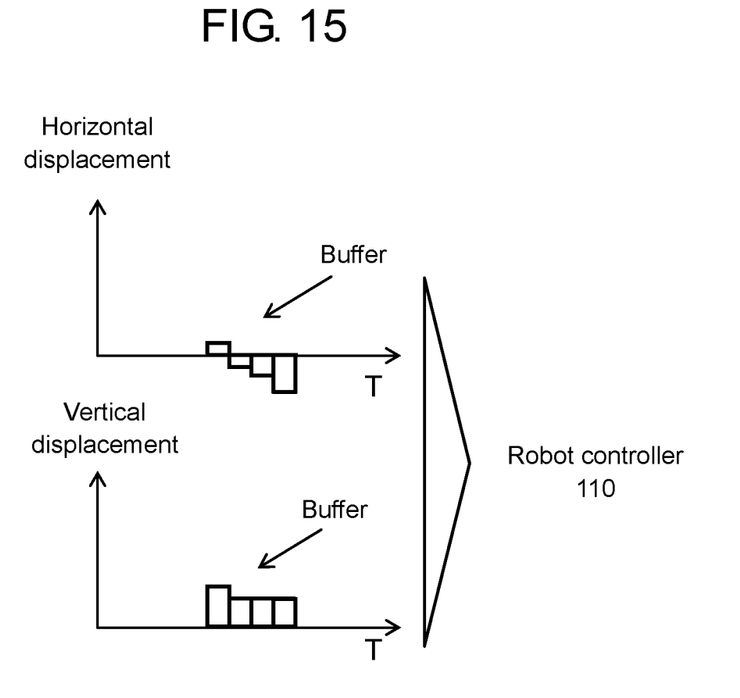
FIG. 15 illustrates transmission of an amount of modification from detection of the edge of the workpiece by the sensor to sending of an end point notice to the robot controller.
Figure 16:
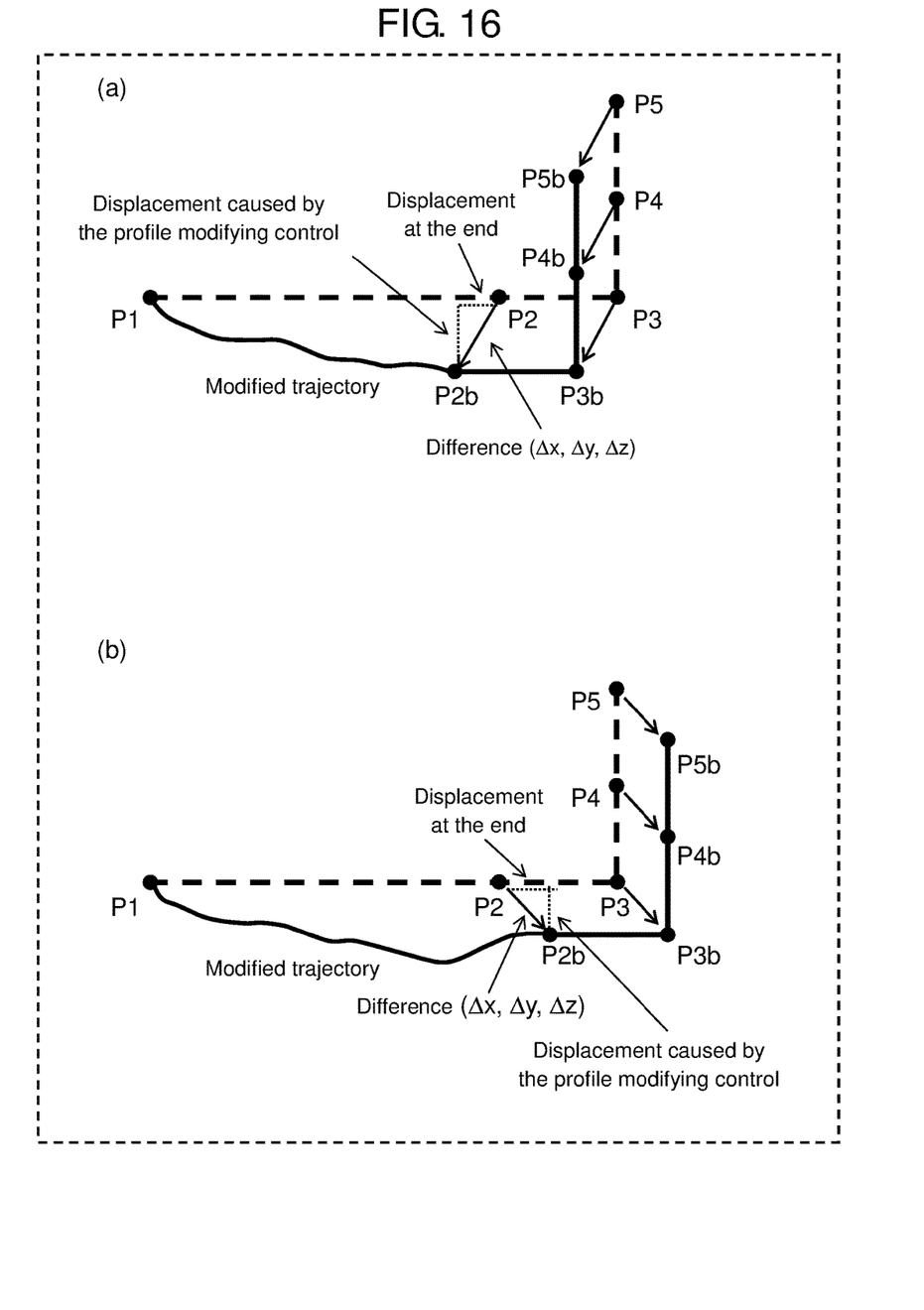
FIG. 16 illustrates modification of teaching points in accordance with the exemplary embodiment. (a) is the case when the end point notice is received at the back of the teaching point in the welding advancing direction. (b) is the case when the end point notice is received in front of the teaching point in the welding advancing direction.

The operation of robot system 100 as configured above is described with reference to FIG. 7 to FIG. 15. FIG. 7 is a perspective view illustrating teaching points P1 to P5 in the exemplary embodiment. FIG. 8 is a sectional view illustrating an attitude of welding torch 123 relative to workpiece W in the exemplary embodiment. FIG. 9 is a perspective view illustrating an attitude of welding torch 123 relative to workpiece W at teaching points P2 to P4. FIG. 10 is a flowchart of the robot control method in the exemplary embodiment. FIG. 11 illustrates a method of generating abnormality decision point P2a from teaching point P2 in the exemplary embodiment. FIG. 12 illustrates calculation of an amount of modification of the welding point from the shape of workpiece W detected by sensor 131 in the exemplary embodiment. FIG. 13 illustrates notification of the amount of modification of the welding point to robot controller 110 in the exemplary embodiment. FIG. 14 illustrates modification of an interpolation point based on modification of the welding point by robot controller 110 in the exemplary embodiment. FIG. 15 illustrates transmission of an amount of modification from detection of an edge of workpiece W to sending of an end point notice to robot controller 110 in the exemplary embodiment. FIG. 16 illustrates modification of teaching points in the exemplary embodiment. (a) is the case when the end point notice is at the back of the teaching point in the welding advancing direction. (b) is the case when the end point notice is in front of the teaching point in the welding advancing direction.

The robot control method in the exemplary embodiment modifies the operation of manipulator 120 in real time, based on the shape of workpiece W obtained by sensor 131. Still more, the robot control method in the exemplary embodiment enables to weld a corner of workpiece W while changing an angle of welding torch 123, taking into account displacement at the edge, when sensor 131 detects the edge of workpiece W. This achieves high-quality welding also at the corner of workpiece W. Furthermore, the welding work can be continued without stopping at the corner. Each step of the robot control method in the exemplary embodiment is detailed below.

(Teaching Step)

FIG. 7 is an example of teaching when no thermal strain or negligibly small strain is generated by welding workpieces W. In FIG. 7, teaching points P1 to P5 are set (taught) in this order in the welding advancing direction. The teaching step is conducted before the welding step. In this step, positions of teaching points P1 to P5, an attitude of welding torch 123 at each teaching point, a trajectory of welding line (straight or arc) between two teaching points, and an attitude of welding torch 123 between two teaching points are set. This creates a program for movement of welding torch 123 in the welding step. Still more, in the teaching step, interpolation points are automatically set between two teaching points at a constant interval, based on a trajectory between two teaching points, so as to further finely set the movement of welding torch 123. In the exemplary embodiment, the trajectories of welding lines between the teaching points are all straight lines.

Next is detailed teaching of an attitude of welding torch 123 in the exemplary embodiment with reference to FIG. 7 and FIG. 8.

As shown in FIG. 7, workpieces W are welded in an L-shape welding line, starting from teaching point P1 at an end of workpiece W. FIG. 8 illustrates an attitude of welding torch 123 from teaching point P1 to teaching point P2 when seen from the welding advancing direction side. As shown in FIG. 8, welding torch 123 is taught to operate (move) retaining an appropriate angle relative to workpieces W, typically determined by the size of workpieces W and welding conditions. In the same way as from teaching point P1 to teaching point P2, welding torch 123 is taught to move retaining an appropriate angle relative to workpieces W from teaching point P4 to teaching point P5.

Next is described teaching of an attitude of welding torch 123 from teaching point P2 to teaching point P4 via teaching point P3, which is a corner, with reference to FIG. 9. FIG. 9 is a perspective view magnifying the corner of workpiece W. Teaching point P2 and teaching point P4 are teaching points not so far away from teaching point P3 that is an edge of workpiece W. More specifically, distance D between teaching point P2 and teaching point P3, and distance D between teaching point P4 and teaching point P3 are shorter than distance L between welding torch 123 and sensor 131. As described above, welding torch 123 is taught to move retaining a certain attitude relative to workpieces W from teaching point P1 to teaching point P2 and from teaching point P4 to teaching point P5. However, attitudes of welding torch 123 largely differ between that from teaching point P1 to teaching point P2 and that from teaching point P4 to teaching point P5. In the exemplary embodiment, the attitude of welding torch 123 is rotated by 90°. Therefore, as shown in FIG. 9, the attitude of welding torch 123 (torch angle) is successively changed from teaching point P2 to teaching point P4 via teaching point P3. At teaching point P3, an intermediate attitude may be taught between an attitude of welding torch 123 from teaching point P1 to teaching point P2 and an attitude of welding torch 123 from teaching point P4 to teaching point P5. Alternatively, the attitude of welding torch 123 may be changed to rotate about an axis perpendicular to workpiece W from the attitude of welding torch 123 at teaching point P2 to the attitude of welding torch 123 at teaching point P4. From teaching point P2 to teaching point P3, the attitude of welding torch 123 (torch angle) is successively changed based on the teaching program stored in robot controller 110. In the same way, from teaching point P3 to teaching point P4, the attitude of welding torch 123 (torch angle) is successively changed to achieve an appropriate attitude (torch angle) on arriving at teaching point P4. By teaching attitudes of welding torch 123 in this way, the corner of workpiece W can be smoothly welded. The attitude of welding torch 123 may be changed to rotate about the axis perpendicular to workpiece W from the attitude of welding torch 123 at teaching point P2 to the attitude of welding torch 123 at teaching point P4. In other words, the attitude may be rotated retaining a predetermined angle formed by welding torch 123 and workpiece W. A rotation speed may be fixed, or accelerated from teaching point P2 to teaching point P3 and decelerated from teaching point P3 to teaching point P4.

(Welding Step)

Next is described the robot control method which is applicable to a strain on workpieces W flexibly caused by welding heat on welding after the aforementioned teaching step is conducted.

FIG. 10 is a flowchart illustrating a series of steps in the robot control method by robot system 100 in the exemplary embodiment. When robot system 100 after being taught starts auto-operation, welding torch 123 is first moved to teaching point P1. Then, trajectory arithmetic part 112 generates abnormality decision point P2a, instead of teaching point P2, at a point extending from teaching point P2 by predetermined distance M in the welding advancing direction. Trajectory arithmetic part 112 then generates linear trajectory from teaching point P1 to abnormality decision point P2a, and welding torch 123 starts to move. Here, trajectory arithmetic part 112 calculates distance D from teaching point P2 to teaching point P3, and notifies it to sensor controller 130. Trajectory arithmetic part 112 also notifies movement speed V of welding torch 123 to sensor controller 130 via sensor control part 111 and first data communication part 114 (STEP 1).

Next, robot system 100 starts to move welding torch 123, and also starts welding (STEP 2). Also at this point, robot system 100 starts the profile modifying control using sensor 131 (STEP 3). When the profile modifying control starts, sensor 131 starts to detect the shape of workpiece W. FIG. 12 shows an example of detection of the shape of workpiece W. For example, when sensor 131 detects the shape indicated by solid line in FIG. 12, modification calculation part 135 compares it with the shape taught in the teaching step. Feature point P detected by sensor 131 and feature point Q taught in the teaching step may be displaced in the sensor coordinate system. This displacement is caused typically by thermal strain on workpieces W due to welding. Sensor 131 is also applicable to thermal strain during welding by modifying this displacement during welding. If teaching takes place after placing workpiece W, there is no placement error of workpiece W. However, if multiple workpieces are welded using the program conducting the teaching step once, displacement due to a placement error of workpiece W may occur in addition to that due to thermal strain. However, sensor 131 is also applicable to displacement due to placement error.

Displacement at this feature point can be expressed by values in the sensor coordinate system. In general, teaching takes place using a two-dimensional sensor coordinate system (X axis and Y axis) perpendicular to the welding advancing direction (Z axis), as shown in FIG. 12. Therefore, when displaced feature point P relative to feature point Q is obtained, as shown in FIG. 12, displacement in the X axis is displacement in the horizontal direction relative to the welding advancing direction. Displacement in the Y axis is displacement in the height direction (vertical direction) relative to the welding advancing direction. After modification calculation part 135 calculates displacement in the horizontal direction and vertical direction relative to the welding advancing direction, sensor controller 130 stores these displacement values in data buffer 136.

FIG. 13 shows displacement values retained in data buffer 136 storing displacement values. As shown in FIG. 13, data buffer 136 includes a buffer for horizontal direction and a buffer for vertical direction relative to the welding line. Each buffer is provided for sampling interval Ts for sending an amount of modification from sensor controller 130 to robot controller 110, and the entire data buffer can retain buffers for time T minute. Here, time T is a value obtained by dividing distance L between sensor 131 and welding torch 123 preset in sensor controller 130 by movement speed v of welding torch 123.

Transmission of the displacement value in the horizontal direction and displacement value in the vertical direction detected by sensor 131 is delayed by time T, and then the displacement values are sent to robot controller 110 via second data communication part 137. When robot controller 110 receives an amount of modification via first data communication part 114, the displacement value in the horizontal direction and the displacement value in the vertical direction received, relative to the welding advancing direction, are converted to displacement values in the robot coordinate system. Then, robot controller 110 adds the displacement values to the set divided interpolation points to modify the interpolation points, in order to achieve a modified trajectory (welding line). Interpolation calculation part 113 calculates an attitude of each shaft of manipulator 120 by inverse kinematics computing, so as to weld at modified interpolation points. Modification calculation part 135 then sends a command to a motor configuring each shaft of manipulator 120 to take the calculated attitude.

An effect of the above operation is described. Sensor 131 always detects the shape of workpiece W ahead of welding torch 123 by distance L. Therefore, displacement detected by sensor 131 is displacement that will occur when welding torch 123 further advances by distance L. Sensor controller 130 thus delays transmission by time T minute obtained by dividing distance L between sensor 131 and welding torch 123 by movement speed v of welding torch 123, using data buffer. After delaying transmission by time T, sensor controller 130 sends an amount of modification to robot controller 110. Robot controller 110 reflects the received amount of modification on the trajectory (welding line) by aforementioned processing in interpolation calculation part 113. Accordingly, displacement detected by sensor 131 is incorporated, and welding torch 123 can weld a position taking into account displacement of workpiece W during welding, as shown in FIG. 14.

Next is described a system of detecting an edge of workpiece W. Welding torch 123 moves toward abnormality decision point P2A created in STEP 1 based on the profile modifying control described in STEP 3. If the edge of workpiece W is not detected, although welding torch 123 reaches abnormality decision point P2a, robot system 100 stops as an error based on a decision that the edge of workpiece W is drastically out of position (Yes in STEP 4).

Sensor 131 always moves ahead of welding torch 123 by distance L. Therefore, sensor 131 can detect the edge of workpiece W ahead of welding torch 123. As described with reference to FIG. 6, sensor 131 detects the shape of workpiece W without feature point when sensor 131 reaches the edge of workpiece W. When the shape without feature point is still detected after a predetermined time passes, sensor controller 130 determines that sensor 131 has reached the edge of workpiece W, and stops storing modification amount to the buffer. Instead, an edge detection flag is turned ON. Even after the edge of workpiece W is detected, sensor controller 130 continues to send modification amount to robot controller 110 for a while. This is because welding torch 123 is still moving at a position before the edge of workpiece W when sensor 131 detects the edge of workpiece W. Displacement at a positon before the edge of workpiece W is stored in the data buffer of sensor controller 130. Therefore, the profile modifying control continues, as shown in FIG. 15, by sequentially sending modification amount in the data buffer to robot controller 110.

Then, sensor controller 130 turns on an edge detection flag of workpiece W, and calculates Time Te=(L−D)/v, using distance L that is a distance between sensor 131 and welding torch 123, distance D that is a distance between teaching point P2 and teaching point P3, and movement speed v of welding torch 123. After time Te passes, sensor controller 130 notifies robot controller 110 via second data communication part 137 that the edge of workpiece W has been detected, i.e., welding torch 123 has reached a point equivalent to teaching point P2. A modified point equivalent to teaching point P2 is set as a first modified point.

Now, an effect of time Te is described. The edge of workpiece W detected by sensor 131 in nature means detection of teaching point P3. After sensor 131 detects teaching point P3, welding torch 123 reaches teaching point P3 by moving distance L, which is a distance between welding torch 123 and sensor 131, at movement speed v. Therefore, arrival of welding torch 123 at a point equivalent to teaching point P3 can be notified after time calculated by Distance L/Movement speed v passes. However, in the exemplary embodiment, an attitude of welding torch 123 (torch angle) starts to be changed before teaching point P3, and thus sensor 131 detects arrival at teaching point P2 before teaching point P3, which is the edge of workpiece W, by distance D. Accordingly time Te from detection of the edge of workpiece W to arrival of welding torch 123 at teaching point P2 is calculated, in order to move welding torch 123 for a distance subtracting distance D from distance L.

Next, is described processing in robot controller 110 after receiving the end point notice from sensor controller 130 (YES in STEP 5) with reference to FIG. 16. FIG. 16 is a top view of FIG. 7, illustrating teaching points P1 to P5. For the convenience of description, vertical displacement is omitted in FIG. 16.

FIG. 16 (a) shows an example that a position receiving the end point notice is before teaching point P2 in the welding advancing direction. The position receiving the end point notice is a modified point displaced from teaching point P2 (first modified point) for a component synthesizing displacement caused by the profile modifying control and displacement caused by the end detection function. In the exemplary embodiment, modified point P2b (first modified point) at the time of receiving the end point notice is received is considered as a position reaching teaching point P2. Since the profile modifying control is stopped at teaching point P2, the profile modifying control is also stopped at modified point P2b at which the end point notice is received (STEP 6).

Trajectory arithmetic part 112 then calculates difference (Δx, Δy, Δz) that is displacement of modified point P2b relative to teaching point P2, and generates modified point P3b (second modified point) in which the same amount of difference is added to teaching point P3 (STEP 7). Furthermore, trajectory arithmetic part 112 regenerates a trajectory for welding torch 123 to move from modified point P2 to modified point P3b, and welding torch 123 continues to move (STEP 8). Movement of welding torch 123 from teaching point P2 to teaching point P3 takes place while the attitude of welding torch (torch angle) is successively changed. In the same way, movement of welding torch 123 from modified point P2b to modified point P3b takes place while the attitude of welding torch 123 (torch angle) is successively changed.

When welding torch 123 reaches modified point P3b (Yes in STEP 9), trajectory arithmetic part 112 generates modified point P4b (third modified point) by adding the amount of difference between teaching point P2 and modified point P2b to teaching point P4, same as for modified point P2b, and generates a trajectory from modified point P3b to modified point P4b. Movement of welding torch 123 from modified point P3b to modified point P4b also takes place while the attitude of welding torch 123 (torch angle) is successively changed, same as movement from teaching point P3 to teaching point P4. Then, when reaching modified point P4b (Yes in STEP 10), a trajectory is regenerated relative to modified point P5b (fourth modified point), in which the amount of difference is added to teaching point P5, and welding torch 123 moves toward modified point P5b. Here, the profile modifying control restarts from modified point P4b to modified point P5b, same as restarting the profile modifying control at teaching point P4 (STEP 11). Welding torch 123 moves to point P5b while the profile modifying control is applied. When welding torch 123 reaches a point equivalent to modified point P5b (fifth modified point), the work ends (Yes in STEP 12). Modified point P4b and modified point P5b may be calculated at the same time as calculating a difference between teaching point P2 and modified point P2b.

The step of welding from teaching point P1 to modified point P2b is the first processing step, the step of modifying teaching points P2 to P5 to modified points P2b to P5b is the modifying step, welding from modified point P2b to modified point P4b is the second processing step, and welding from modified point P4b to modified point P5b is the third processing step.

FIG. 16(b) shows an example when a position receiving the end point notice is ahead of teaching point P2 in the welding advancing direction. A control method in this case can be achieved by the same control as that described in FIG. 16(a).

Next, an effect of the exemplary embodiment is described.

In the exemplary embodiment, the profile modifying control by sensor 131 stops at a position before the edge of workpiece W by distance D. Then, the corner of workpiece W is welded while the attitude of welding torch 123 (torch angle) is changed based on the operation program stored in robot controller 110. If the attitude of welding torch 123 is changed at the corner of workpiece W while the profile modifying control is applied, a positional relationship of sensor 131 fixed on welding torch 123 and workpiece W will also be changed. This results in losing proper recognition of the position of workpiece W. Accordingly, the profile modifying control is stopped and then the corner of workpiece W is welded while the attitude of welding torch 123 is changed, as in the exemplary embodiment, so that the correct position of workpiece W can be identified. However, if distance D between teaching point P2 and teaching point P3 is enlarged, a period of profile modifying control becomes short. Distance D is thus preferably suppressed to a distance needed for changing the attitude of welding torch 123.

As described above, bead at the corner of workpiece W can be made to a required shape by tentatively stopping the profile modifying control by sensor 131 and welding the corner of workpiece W while changing the attitude of welding torch 123. Welding at the corner of workpiece W is a partial section in the entire welding section of workpiece W. Accordingly, only negligible displacement occurs due to a strain generated by welding the corner section. Tentative stoppage of profile modifying control is thus not a problem.

Still more, distance L and distance D are stored in advance in sensor controller 130 in the exemplary embodiment. Distance L is a distance between welding torch 123 and sensor 131. Distance D is a distance between teaching point P3 that is the edge of workpiece W and teaching point P2 before the edge. Time that welding torch 123 reaches modified point P2b equivalent to teaching point P2 is calculated based on distance L, distance D, and speed v; and notified to robot controller 110 at the time sensor 131 detects teaching point P3 that is the edge of workpiece W. This enables to execute the operation according to teaching from a position before the position detected by sensor 131 by predetermined distance D even if the edge of workpiece W is displaced typically due to thermal strain by welding.

Still more, in the exemplary embodiment, abnormality decision point P2a for receiving the end point notice is created at a point ahead of teaching point P2 in the welding advancing direction, and the trajectory control is applied to abnormality decision point P2a. This enables to move welding torch 123 continuously even if a point at which the end point notice is received is ahead of teaching point P2, as shown in FIG. 16(b).

Still more, in the exemplary embodiment, teaching point P3 that is the edge of workpiece W, teaching point P2 before the edge by distance D, and distance D are stored in sensor controller 130 to enable sensor controller 130 to calculate modified point P2b equivalent to teaching point P2. However, distance D may be stored in robot controller 110. In this case, sensor controller 130 sends the end point notice to robot controller 110 at the time sensor 131 detects the end point of workpiece W, and robot controller 110 considers a position advanced by distance D from the time receiving the end point notice as modified point P2b.

Still more, in the exemplary embodiment, sensor 131 using laser beam is used as a detector for recognizing workpiece W. However, as long as the shape of workpiece W can be recognized, detectors other than sensor 131 using laser beam are applicable. For example, equipment for image recognition using camera and equipment using ultrasonic waves can be used as the detector.

Still more, the exemplary embodiment refers to an example of mounting sensor 131 on welding torch 123. However, sensor 131 may be mounted on manipulator 120 such that sensor 131 is in front of welding torch 123 with predetermined distance L.

Still more, the weaving operation may be added to welding torch 123 in the exemplary embodiment. This further is applicable to displacement of welding position.

Still more, the exemplary embodiment refers to a welding line with one corner (one bending). However, the control in the exemplary embodiment is applicable to each corner even when the welding line includes multiple corners. This achieves further efficient welding.

Still more, the exemplary embodiment refers to the arc welding torch as an example of work tool. However, the work tool may also be a laser head for laser welding that achieves welding by laser beam. Furthermore, the exemplary embodiment refers to welding as an example of processing. However, processing may be coating using a coating material or application of adhesive. In this case, a spray gun may be given as an example of the work tool.

INDUSTRIAL APPLICABILITY

The robot control method of the disclosure can achieve a required finish by continuous processing even if a processing line includes a bent part. This further improves work efficiency, and is thus industrially useful.

The invention claimed is:

1. A robot control method for performing processing on a workpiece on a processing line using a work tool and a sensor mounted on the processing line in advance of the work tool, the processing line including a plurality of teaching points for the workpiece, the robot control method comprising:
  setting, in advance of the processing of the workpiece, a first teaching point, a second teaching point, a third teaching point, a fourth teaching point, and a fifth teaching point on the processing line for the workpiece, each of the first teaching point, the second teaching point, the third teaching point, the fourth teaching point, and the fifth teaching point corresponding to a position of the work tool during the processing of the workpiece in a process advancing direction on the processing line, the third teaching point corresponding to a turning point of the work tool on the processing line;
  a first processing of performing the processing on the workpiece using the work tool from the first teaching point to the second teaching point on the processing line and applying a profile modifying control to change the position of the work tool with respect to the processing line based on a shape of the workpiece detected by the sensor;
  changing, based on a difference between the second teaching point and a first modified point, the third teaching point to a second modified point, the fourth teaching point to a third modified point, and the fifth teaching point to a fourth modified point, wherein the first modified point is a point reached by the profile modifying control in the first processing based on the shape of the workpiece detected by the sensor and corresponding to the second teaching point;
  a second processing of performing the processing on the workpiece using the work tool from the first modified point through the second modified point, and then to the third modified point; and
  a third processing of performing the processing on the workpiece using the work tool from the third modified point to the fourth modified point and applying the profile modifying control to change the position of the work tool with respect to the processing line based on the shape of the workpiece detected by the sensor, wherein an angle of the work tool with respect to the processing line is changed during the second processing of the workpiece.

2. The robot control method of claim 1, wherein the profile modifying control is not applied during the second processing.

3. The robot control method of claim 1, wherein a distance between the second teaching point and the third teaching point is shorter than a distance between the work tool and the sensor.

4. The robot control method of claim 1, wherein the work tool is an arc welding torch, the sensor is a laser sensor, and the processing line is a welding line.

5. The robot control method of claim 1, wherein the work tool is a laser head for laser welding, the sensor is a laser sensor, and the processing line is a welding line.

6. The robot control method of claim 1, wherein the angle of the work tool with respect to the processing line is fixed during the first processing.

7. The robot control method of claim 1, wherein the angle of the work tool with respect to the processing line is fixed during the third processing.

\* \* \* \* \*